(12) United States Patent
Cheng

(10) Patent No.: US 6,485,216 B1
(45) Date of Patent: Nov. 26, 2002

(54) CONTROL DEVICE FOR FOLDING MOVEMENT OF A STROLLER

(75) Inventor: Ying-Hsiung Cheng, Tainan Hsien (TW)

(73) Assignee: Pao-Hsien Cheng, Tainan Hsien (TW)

( * ) Notice: Subject to any disclaimer, the term of this patent is extended or adjusted under 35 U.S.C. 154(b) by 0 days.

(21) Appl. No.: 09/884,125

(22) Filed: Jun. 20, 2001

(51) Int. Cl.$^7$ ................................. B62B 7/06
(52) U.S. Cl. .............. 403/102; 74/500.5; 74/501.6; 74/502.4; 74/502.6; 74/551.1; 74/551.3; 74/567; 74/569; 280/642; 280/650; 280/47.36; 280/47.371
(58) Field of Search ............. 5/48.2, 99.1, 102; 16/113.1, 324, 326; 74/500.5, 501.6, 502.4, 502.6, 551.1, 551.3, 567, 569; 28/47.36, 47.371, 642, 650, 655, 655.1; 403/34, 81, 315, 321, 322.1, 102, 322.3

(56) References Cited

U.S. PATENT DOCUMENTS

| | | | | |
|---|---|---|---|---|
| 4,362,315 A | * | 12/1982 | Kassai ...................... 280/650 |
| 4,906,017 A | * | 3/1990 | Kassai ...................... 280/642 |
| 5,293,656 A | * | 3/1994 | Chan ......................... 5/99.1 |
| 5,483,710 A | * | 1/1996 | Chan ......................... 5/99.1 |
| 5,511,441 A | * | 4/1996 | Arai ........................ 74/501.6 |
| 5,524,503 A | * | 6/1996 | Ishikura .................. 74/501.6 |
| 5,644,816 A | * | 7/1997 | Chou ......................... 16/115 |
| 5,769,447 A | * | 6/1998 | Huang ...................... 280/642 |
| 5,865,447 A | * | 2/1999 | Huang ........................ 280/30 |
| 5,979,928 A | * | 11/1999 | Kuo ........................ 280/642 |
| 6,068,284 A | * | 5/2000 | Kakuda .................... 280/642 |
| 6,322,098 B1 | * | 11/2001 | Lan ......................... 280/642 |
| 6,375,213 B1 | * | 4/2002 | Suzuki ..................... 280/649 |

* cited by examiner

Primary Examiner—Robert J. Sandy
Assistant Examiner—Ruth C. Rodriguez
(74) Attorney, Agent, or Firm—Rosenberg, Klein & Lee

(57) ABSTRACT

A control device for folding movement of a stroller includes a safety button, a control button, two upper locking members and two lower locking members. The safety button can move left and right along an elongated opening of a housing member connected to the handle. The control button can move up and down through a lower hole of the housing, and has two pivotal bars having upper holes pivoted to a pivotal rod passing through upright elongated holes of lateral protrusions of the control button. When the safety button is pushed sideways to disengage the tops of the lateral protrusions, the control button can be pushed up for inner bottom curved surface to force the pivotal bars to pivot towards a respective edge of the control button. Steel ropes connected to the lower ends of the bars are pulled by the bars to lift upper locking members, which are provided to engage lower locking members pivoted to the frame of the stroller. Thus, the upper members disengage the lower locking members for the stroller to be foldable.

2 Claims, 9 Drawing Sheets

CONTROL DEVICE FOR FOLDING MOVEMENT OF A STROLLER

BACKGROUND OF THE INVENTION

The present invention relates to a control device for folding movement of a stroller, which can prevent the stroller from being accidentally folded to hurt the baby sitting in the stroller, and which can be operated very easily for making the stroller become foldable.

The safety of a stroller is regarded as an important matter by consumers besides the convenience and appearance. Safety standards of stroller are stipulated in many countries, and one of them is providing a safety means to a stroller so that the stroller won't be accidentally folded to hurt the baby lying in it.

SUMMARY OF THE INVENTION

Therefore, it is main object of the present invention to provide a control device for folding movement of a stroller for preventing the stroller from being accidentally folded.

The control device of the present invention includes a housing member, an upper locking member and a lower locking member.

The housing member is connected to the handle of the stroller, and has a safety button movable along a horizontal elongated opening of an upper part of the housing. The safety button is biased to the center of the upper part by a spring, and has two downwards projecting stopping parts.

A control button is up and down movably passed through an opening of a lower part of the housing. The stopping parts will abut the tops of lateral protrusions of the control button to stop the control button from moving up when the safety button is moved to the center of the upper part by the spring.

The lateral protrusion each has an upright elongated hole. The control button has two pivotal bars having upper holes pivoted to a pivotal rod passing through the upright holes, and has a torsion spring associated with the upper portions of the pivotal bars for biasing same towards a middle ridge formed by two curved surfaces on an inner bottom of the control button. The curved surfaces push lower ends of the pivotal bars towards a respective edge of the control button when the control button is pushed up to an unlocking position under an disengage position of the safety button where the safety button separates from the tops of the lateral protrusions of the control button.

The upper unlocking members are movably connected to outer sides of the handle support rods of the stroller, and biased down by springs, and connected to a respective one of the lower ends of the pivotal bars by steel ropes. The lower locking members are pivoted to the rear support rods and the handle support rods of the stroller so that same can prevent the stroller from being folded when the upper locking members are biased down to engage the lower locking members. The upper locking members are lifted to disengage the lower locking members for the stroller to be folded when the control button is pushed up for the lower ends of the pivotal bars to pull the ropes.

BRIEF DESCRIPTION OF THE DRAWINGS

This invention will be better understood by referring to the accompanying drawings, wherein.

DETAILED DESCRIPTION OF THE PREFERRED EMBODIMENT

Figure 8:
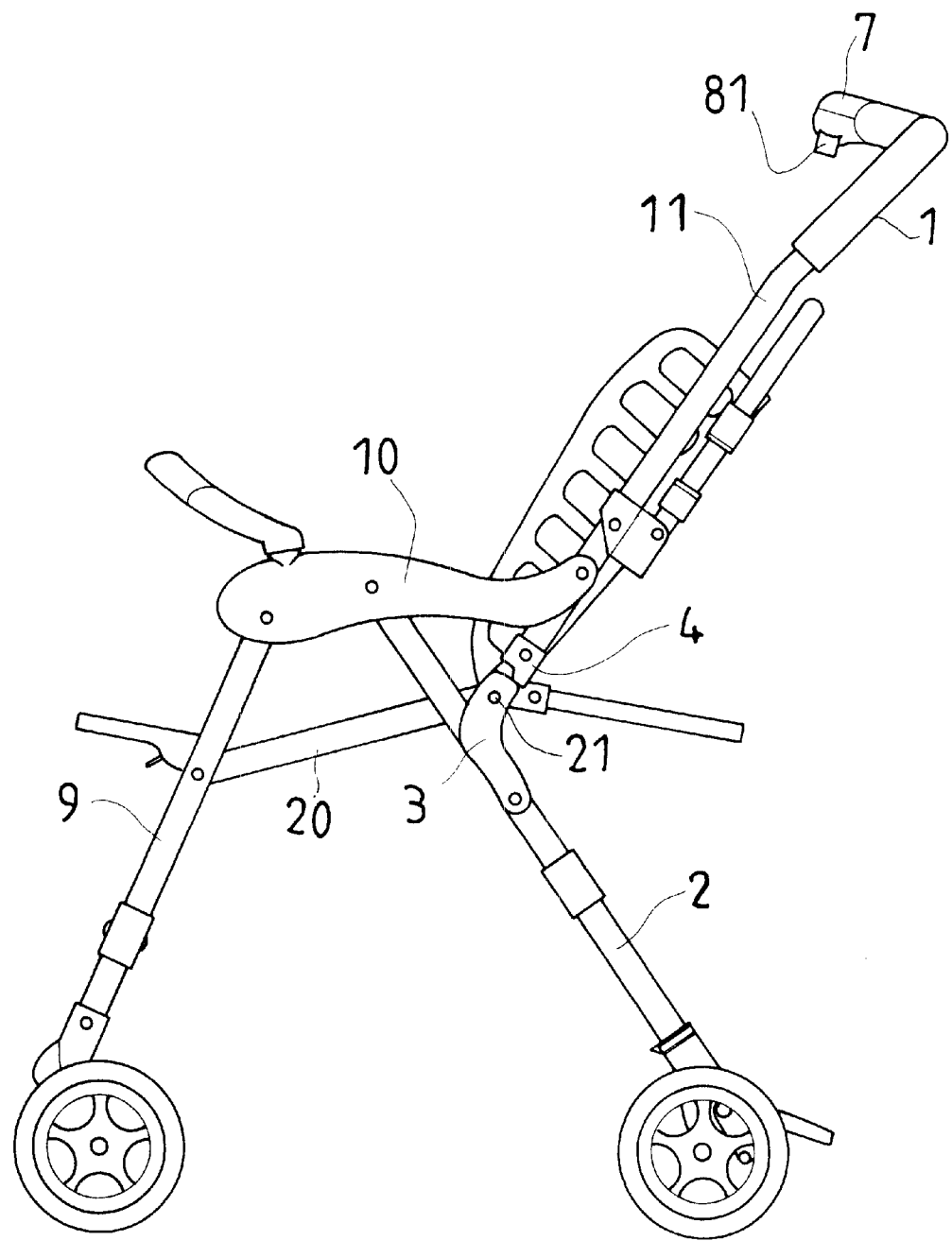
FIG. 8 is a side view of a stroller with the control device of the present invention, unfolded to an un-use position.

Referring to FIG. 8, a foldable stroller includes a handle 1, handle support tubes 11, rear support rods 2, a transverse support rod 20, front support rods 9, lateral connecting members 10, wheel (not numbered), and a control device of the present invention.

The handle 1 is connected to the upper ends of the handle support rods 11 from two ends thereof The lateral connecting members 10 are pivoted to the handle support tubes 11 from rear ends. The upper ends of the front support rods 9 are pivoted to the front ends of the lateral connecting members 10. The upper ends of the rear support rods 2 are pivoted to the middle parts of the lateral connecting members 10. The front ends of the transverse support rods 20 are pivoted to the front support rods 9. The rear ends of the transverse support rods 20 are pivoted to the lower ends of the handle support tubes 11 by means of pivotal rods 21.

Figure 1:
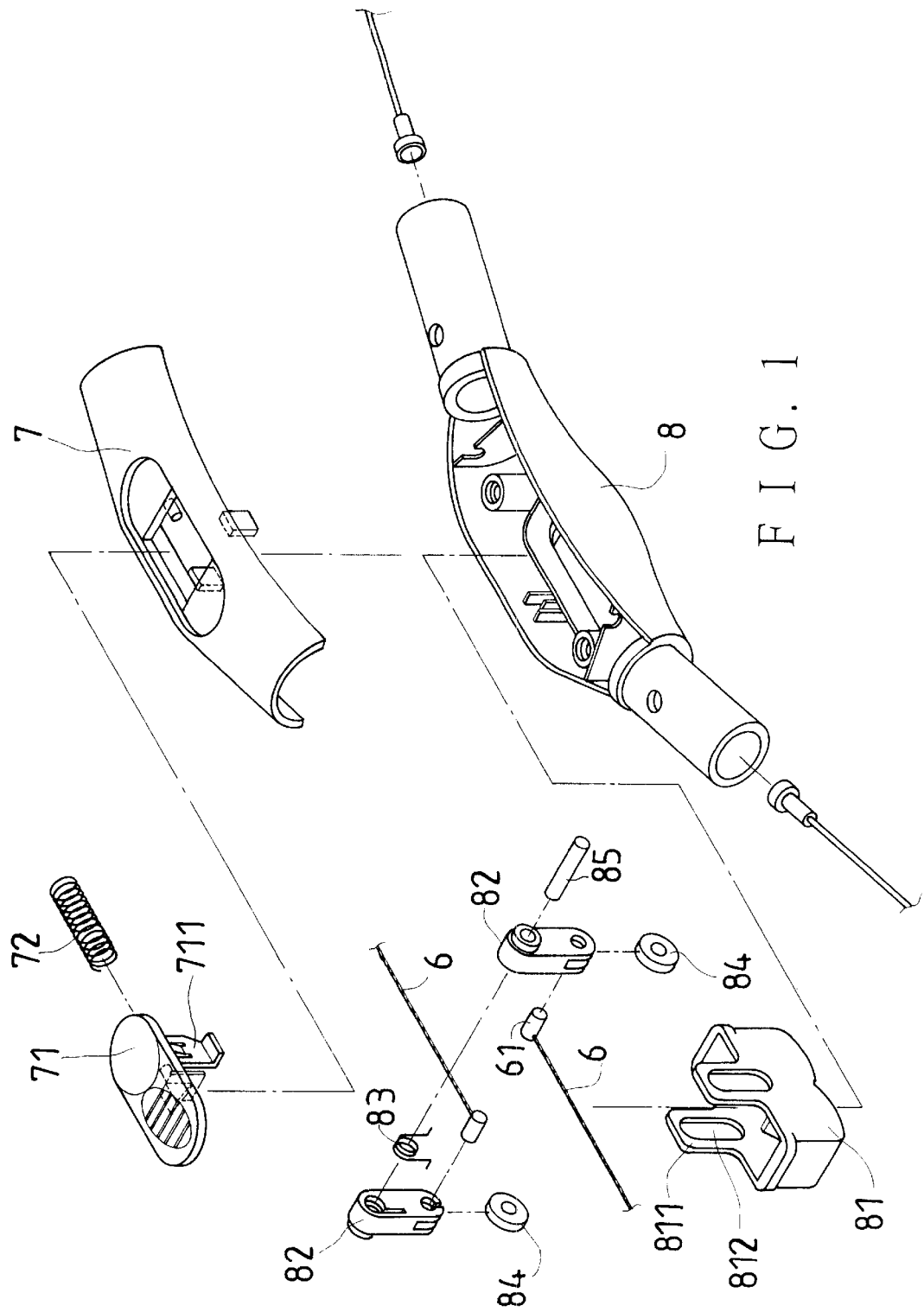
FIG. 1 is a fragmentary exploded perspective view of the control device of the present invention.
Figure 4:
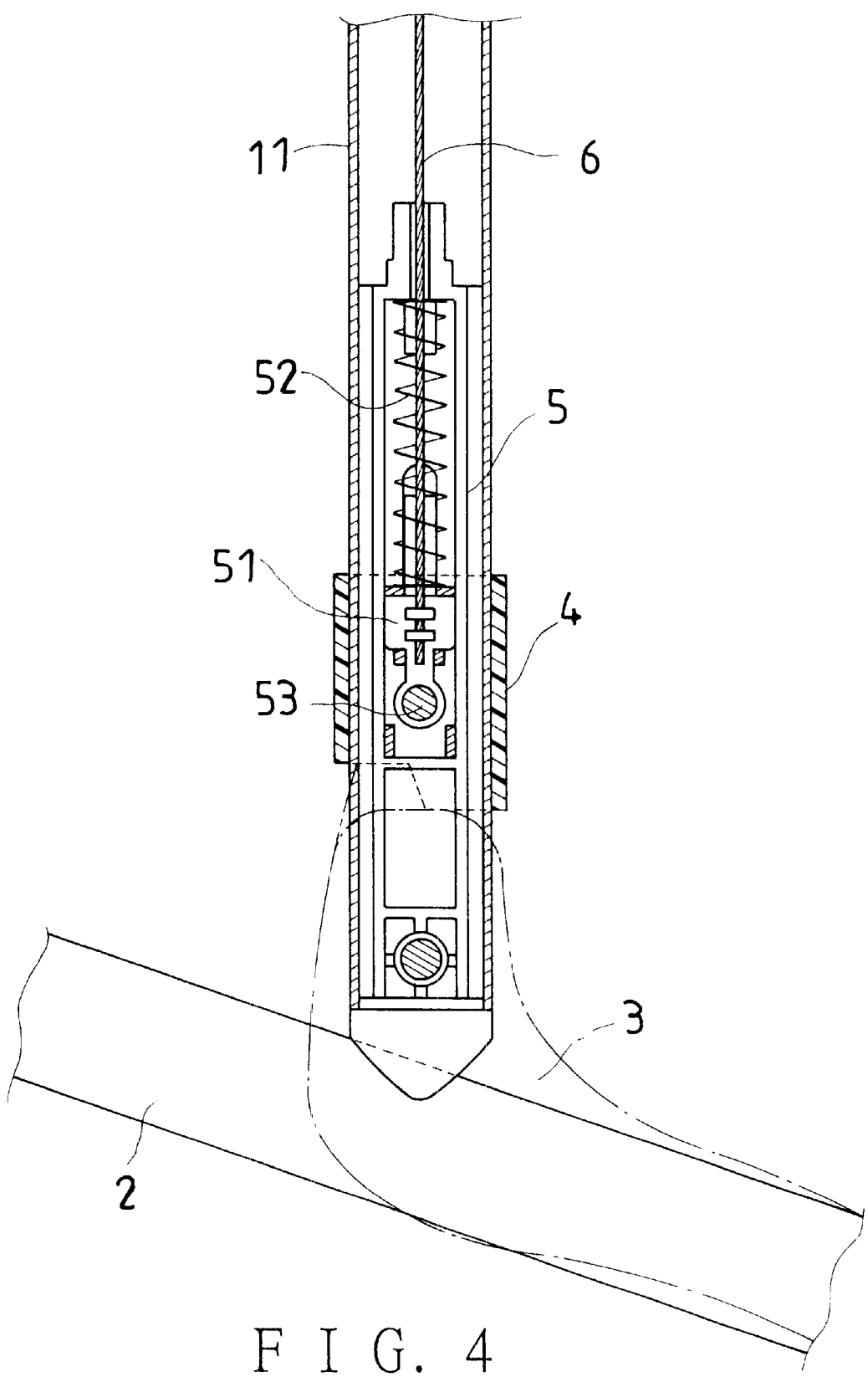
FIG. 4 is a cross-sectional view of the part of the control device in FIG. 3.

Referring to FIGS. 1, 4 and 8, the control device for folding movement of a stroller in the present invention includes upper locking members 4, stationary guide members 5, steel ropes 6, lower locking members 3, two pivotal bars 82, a safety button 71, a control button 81 and a housing member consisting of an upper part 7 and a lower part 8.

Referring to FIG. 1, the housing member is connected to the middle part of the handle 1 with the steel ropes 6 passing into two ends thereof, the steel ropes 6 also pass through the handle 1 and the handle support tubes 11.

The upper part 7 has an elongated opening (not numbered) on the top side, and attached to the lower part 8 with the elongated opening communicating with a central holding room of the lower part 8. The safety button 71 has two stopping parts 711 sticking out from the lower side, and is movably fitted onto the elongated hole of the upper part 7 so that same can slide along the elongated hole of the upper part 7. The safety button 71 is biased towards the center of the elongated hole of the upper part 7 by a spring 72 connected to both same and the upper part 7.

Figure 2:
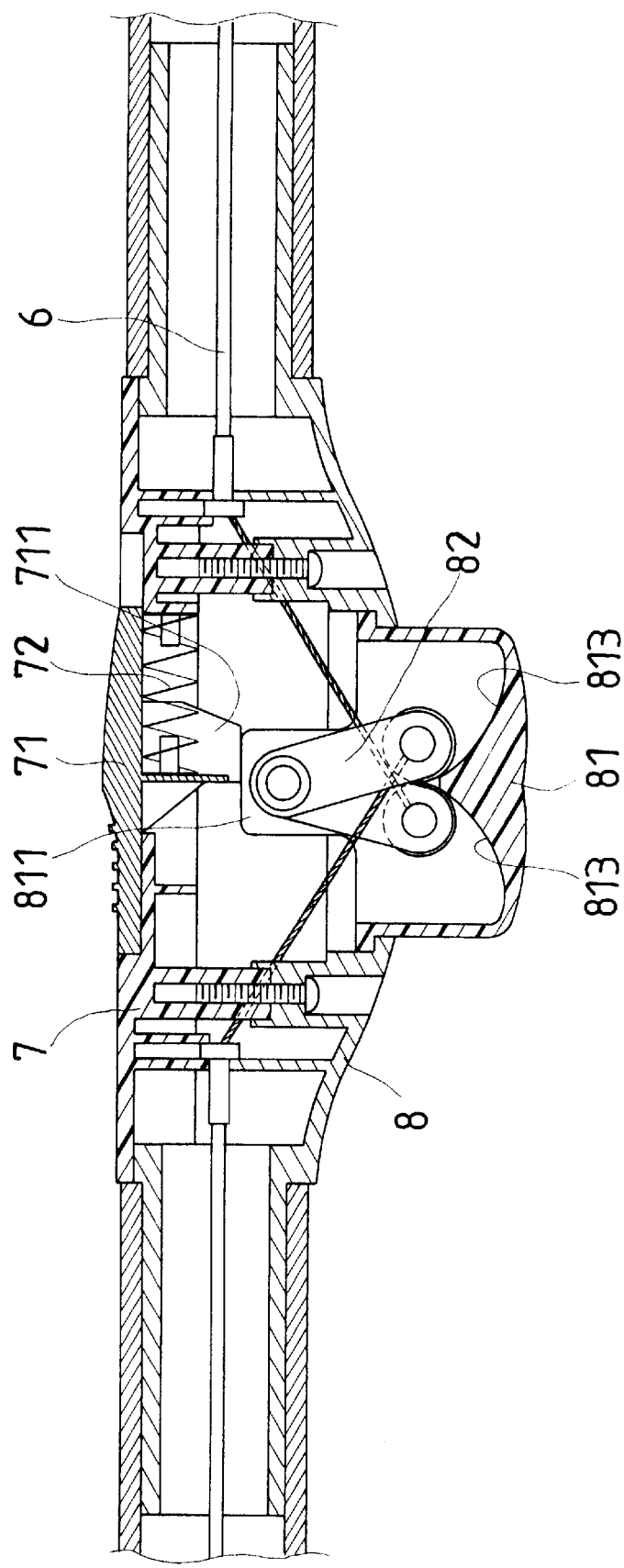
FIG. 2 is a cross-sectional view of the part of the control device of the present invention in FIG. 1.

The lower part 8 has an opening on the bottom, communicating with the central holding room thereof The control button 81 has two lateral protrusions 811 each having an upright elongated hole 812, and has two curved surfaces 813 connected to form a ridge at the center of the control button 81 (as shown in FIG. 2). The pivotal bars 82 each has an upper hole and a lower hole (not numbered), and has a wheel 84 passing into a lower gap thereof so that the central hole of the wheel 84 aligns with the lower hole. A torsion spring 83 is connected to the pivotal bars 82 from two ends with the central round hole defined by the coiled part being aligned with the upper holes of the pivotal bars 82. A pivotal rod 85 is passed through the elongated holes 812, the upper holes of the pivotal bars 82 and the round hole of the torsion spring 83 so that the pivotal bars 82 can pivot on the control button 81 and the control button 81 can move up and down relative to the pivotal bars 82. The torsion spring 83 biases the pivotal bars 82 towards the ridge formed between the curved surfaces 813 of the control button 81. The steel ropes 6 each has a pivotal rod 61 connected to the upper end; the rods 61 are passed through the lower holes of the pivotal bars 82 and the central holes of the wheels 84 to connect the wheels 84 to the pivotal bars 82.

Figure 5:
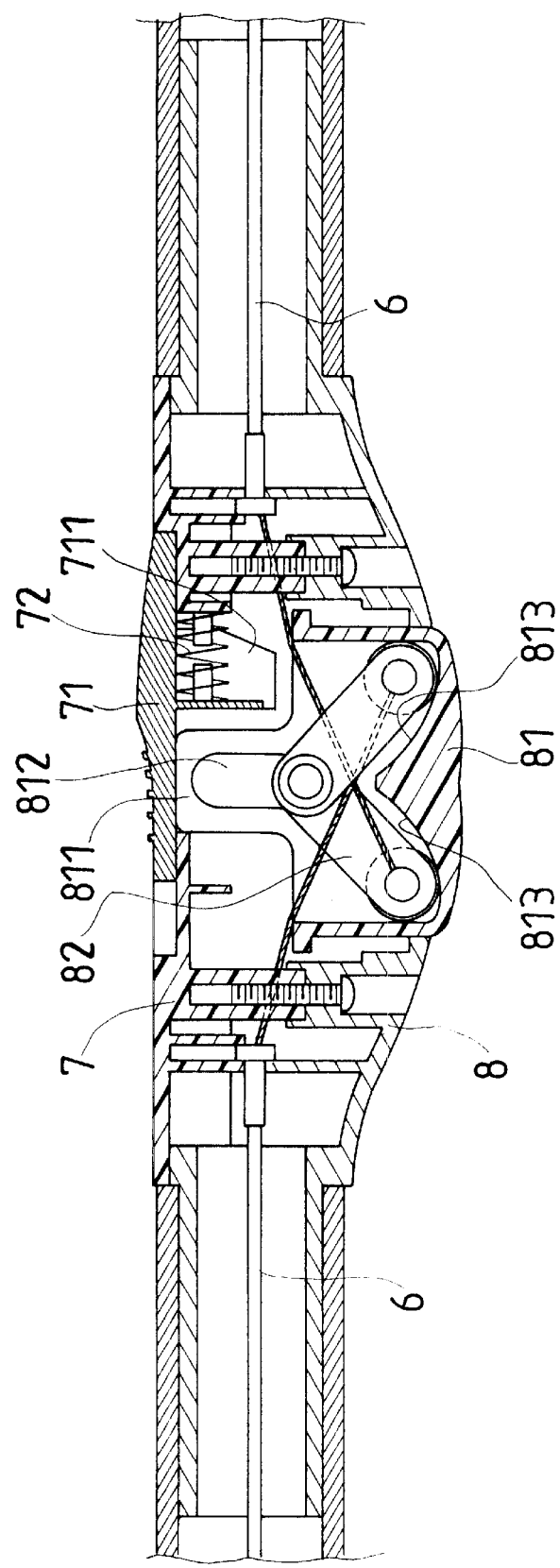
FIG. 5 is a cross-sectional view of the part of the control device in FIG. 1 with the control button being moved up to the unlocking position.
Figure 6:
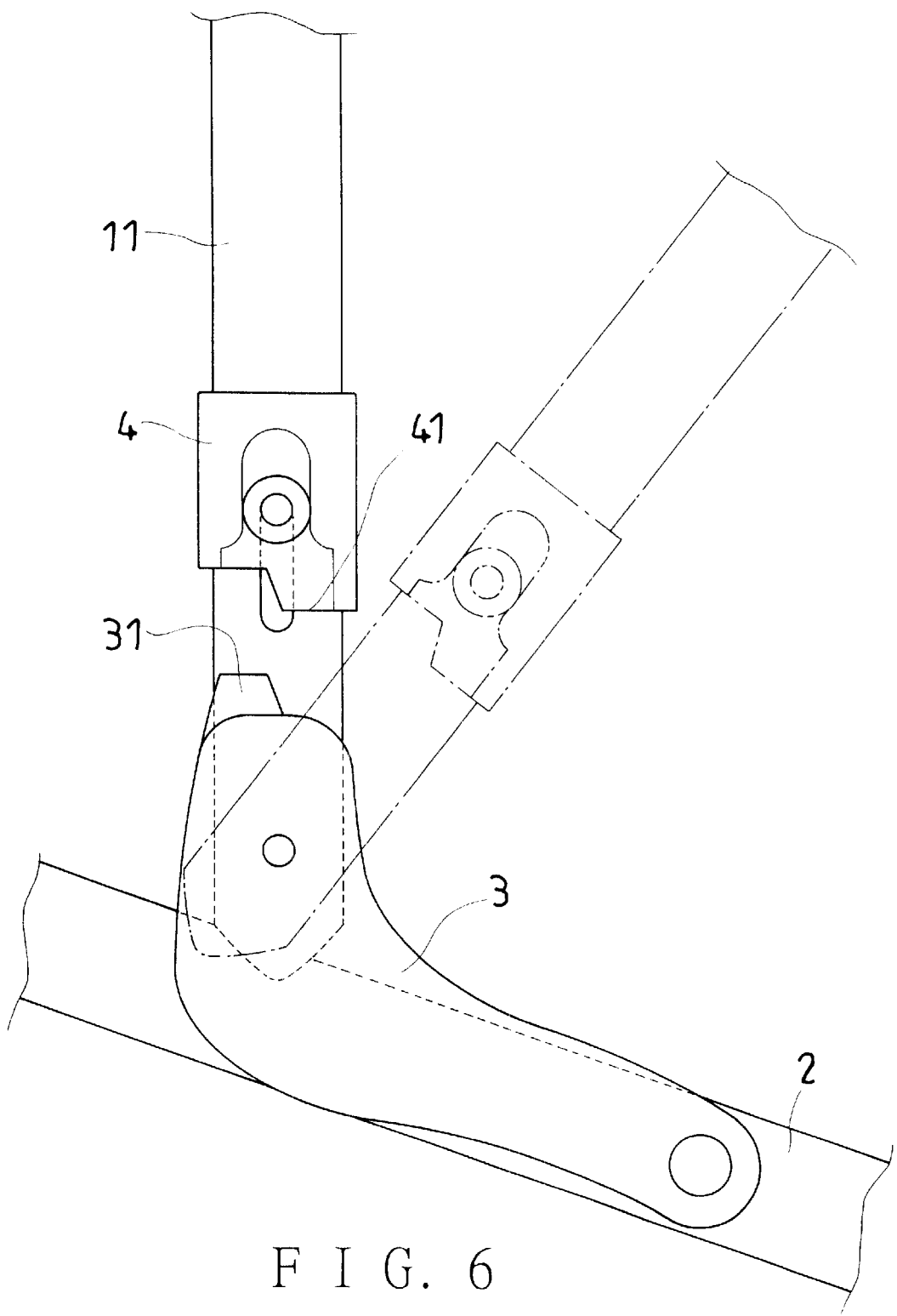
FIG. 6 is a fragmentary side view of the control device with the upper locking member being lifted, and the handle support rod being pivoted for folding the stroller.
Figure 7:
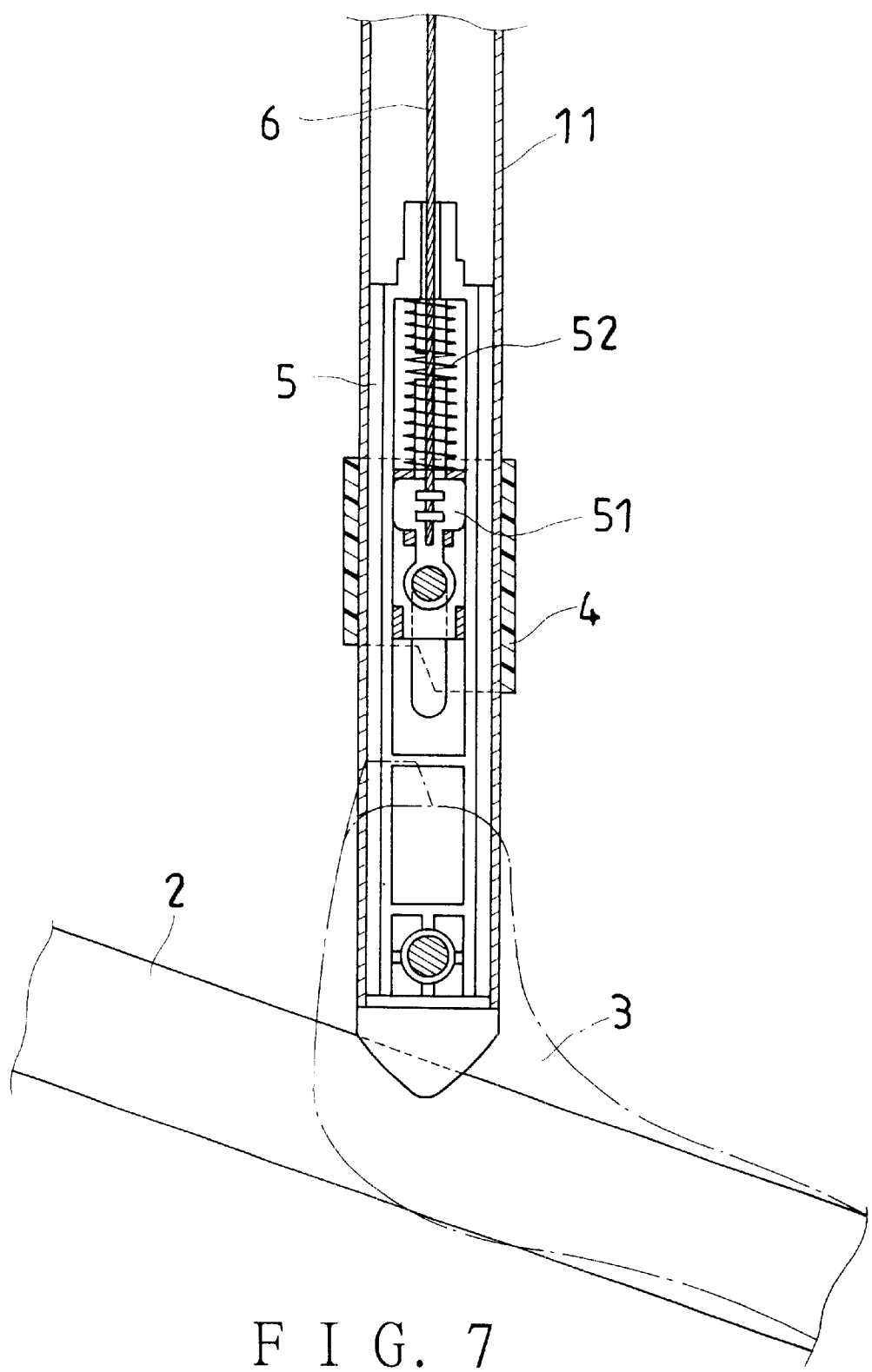
FIG. 7 is a fragmentary cross-sectional view of the control device with the upper locking member being lifted.

The tops of the lateral protrusions 811 of the control button 81 will abut a corresponding one of the stopping parts 711 of the safety button 71, and can't move further up when the safety button 71 is biased to the central part of the elongated hole of the upper part 7 by the spring 72; thus, the control button 81 is in the locking position. When the safety button 71 is slid away from the center of the upper part 7, the stopping parts 711 no longer contact the top of the lateral protrusions 811 of the control button 81, permitting the control button 81 to be pushed upwards from the bottom; thus, the curved surfaces 813 will abut the wheels 84, and push the lower ends of he pivotal bars 82 to the edges of the control button 81, when the control button 81 is pushed up to the unlocking position, as shown in FIG. 5.

Figure 3:
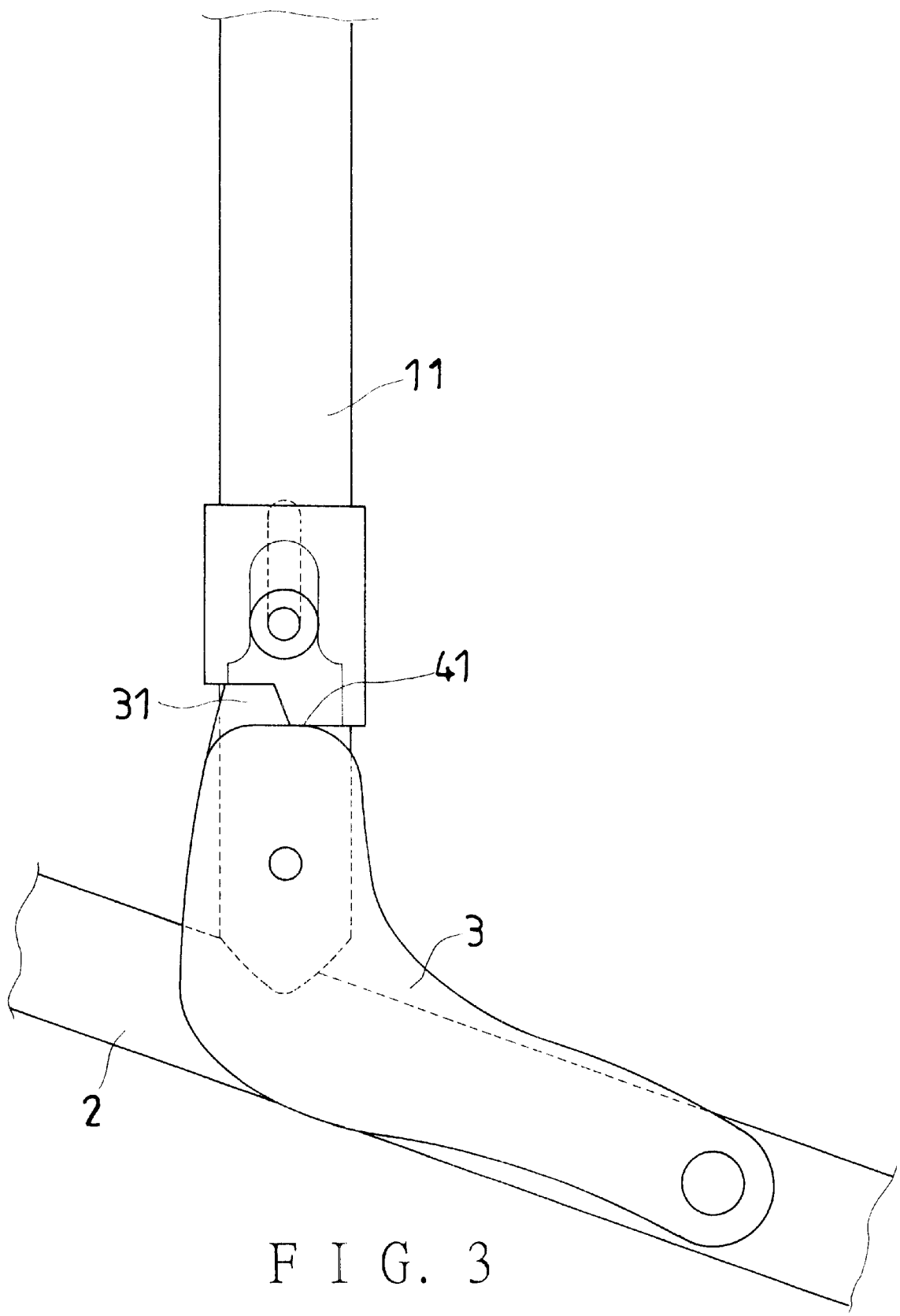
FIG. 3 is another fragmentary side view of the control device of the present invention.

Referring to FIGS. 3 and 4, the stationary guide member 5 is fixed in the lower end portion of the handle support rods 11 with the lower end portions of the steel ropes 6 passing into both a central receiving room and a spring 52 disposed in the receiving room. Slide blocks 51 are slidably received in the receiving rooms of the stationary guide members 5, and connected to the lower ends of the steel ropes 6, and abut the upper ends of the springs 52 so that the springs 52 bias same downwards. The upper locking members 4 are movably connected to outer sides of the handle support rods 11, and have engaging end portions 41 at the lower parts; the slide blocks 51 have connecting parts 53 passing through elongated slots (FIG. 3) of the handle support rods 11 to connect the upper locking members 4. Thus, the upper locking members 4 can be lifted by pushing the control button 81 up to the unlocking position to pull the steel ropes 6.

Referring to FIGS. 4 and 8, the lower locking members 3 are pivoted to the transverse support rods 20 also by means of the pivotal rods 21. The lower locking members 3 each has an upper engaging end portions 31, and are pivoted to the rear support rods 2 from lower ends.

When the control button 81 is in the locking position, the upper locking members 4 are biased down by the springs 52 for the lower engaging ends 41 to engage the upper engaging ends 31 of the lower locking members 3 so that the lower locking members 3 can't be moved, and the stroller can't be folded.

Figure 9:
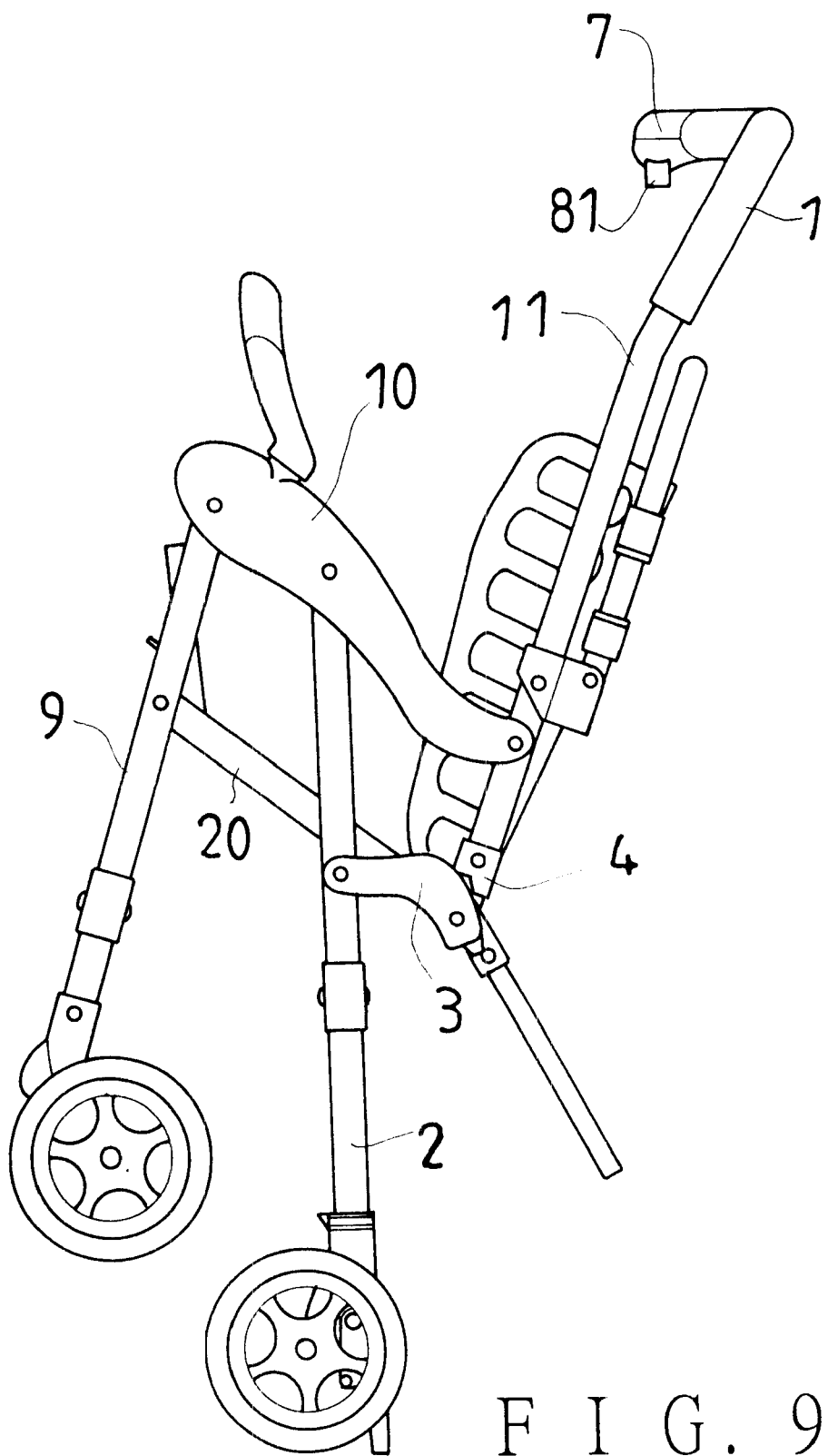
FIG. 9 is a side view of a stroller with the control device of the present invention folded to a not-in-use position.

When the control button 81 is moved up to the unlocking position, the steel ropes 6 are pulled (FIG. 5) to lift the slide blocks 51 and the upper locking members 4 so that the upper locking member 4 disengage he lower locking members 3, permitting the lower locking members 3 to pivot on the associated parts; thus, the stroller can be folded as shown in FIG. 9.

When the stroller is unfolded to the in-use position, the upper locking members 4 are biased down by the springs 52 to engage the lower locking members 3, and the safety button 71 is moved by the spring 72 for the stopping parts 711 to abut the tops of the lateral protrusions 811 of the control button 81 to prevent the control button 81 from being accidentally moved up to the unlocking position.

From the above description, the control device for folding movement of a stroller according to the present invention can be known to be able to prevent the stroller from being accidentally folded to hurt the baby in the stroller. And, the control device can be operated very easily for making the stroller become foldable.

What is claimed is:

1. A control device for folding movement of a stroller, comprising a housing member connected to a handle of said stroller; said housing member having a safety button movable along an elongated opening of an upper part thereof; said safety button having two downwards projecting stopping parts for abutting a top of a respective one of protrusions of a control button movably up and down passing through an opening of a lower part of said housing member to stop said control button from moving upwards when said safety button is biased by a spring associated therewith to a central part of said upper part;

said control button having upright elongated holes on said protrusions; said control button having two pivotal bars having upper holes pivoted to a pivotal rod passing through said upright elongated holes, and having a torsion spring associated therewith for biasing the pivotal bars towards a middle ridge of a bottom of said control button; said middle ridge being formed between two curved surface of said bottom of said control button provided for pushing a lower end of said pivotal bars towards a respective edge of said control button when said control button is pushed upwards to an unlocking position;

said lower ends of said pivotal bars each being connected to a steel rope; said steel ropes passing through two ends of said housing member to connect a respective upper engaging member movable along an outer side of a respective one of handle support rods associated with said handle; said upper locking members being biased downwards by springs to engage a respective one of lower locking members of said control device pivoted to said handle support rods and rear support rods of said stroller to prevent said lower locking members from moving, preventing said stroller from being folded;

said safety button being pushed away from said center of said housing member to disengage said top of said protrusions of said control button, permitting said control button to be pushed up to said unlocking position where said steel rope is pulled by said pivotal bars to lift said upper locking members for said upper locking members to disengage said lower locking members for said stroller to become foldable.

2. The control device for folding movement of a stroller as claimed in claim 1, wherein said lower ends of said pivotal bars each has a wheel turnably fitted thereto for permitting said curved surfaces of said control button to get into contact with when said control button is moved upwards.

* * * * *